(12) United States Patent
Mukai (10) Patent No.: US 10,664,213 B2
(45) Date of Patent: May 26, 2020

(54) INFORMATION PROCESSING SYSTEM AND APPARATUS

(71) Applicant: Kazuhiro Mukai, Kanagawa (JP)

(72) Inventor: Kazuhiro Mukai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/355,758

(22) Filed: Mar. 17, 2019

(65) Prior Publication Data

US 2019/0303080 A1  Oct. 3, 2019

(30) Foreign Application Priority Data

Mar. 29, 2018  (JP) .................................. 2018-065116

(51) Int. Cl.
G06F 3/12 (2006.01)
G06F 21/60 (2013.01)
G06F 21/35 (2013.01)

(52) U.S. Cl.
CPC .......... *G06F 3/1263* (2013.01); *G06F 3/1204* (2013.01); *G06F 21/35* (2013.01); *G06F 21/608* (2013.01)

(58) Field of Classification Search
None
See application file for complete search history.

(56) References Cited

U.S. PATENT DOCUMENTS

| 2010/0238495 | A1* | 9/2010 | Sugimoto | G06F 21/608 |
| | | | | 358/1.15 |
| 2017/0052745 | A1* | 2/2017 | Kanematsu | G06F 3/1263 |
| 2018/0210686 | A1 | 7/2018 | Takigawa et al. | |

FOREIGN PATENT DOCUMENTS

| JP | 2009-220331 | 10/2009 |
| JP | 2011-056918 | 3/2011 |
| JP | 2018-037927 | 3/2018 |
| JP | 2018-120334 | 8/2018 |

* cited by examiner

*Primary Examiner* — Dov Popovici
(74) *Attorney, Agent, or Firm* — Oblon, McClelland, Maier & Neustadt, L.L.P.

(57) ABSTRACT

An information processing system and apparatus are provided. The information processing system includes the information processing apparatus and an image processing apparatus connected to the information processing apparatus through a network. The information processing apparatus authenticates a user based on a card identifier (ID) acquired through the network, and controls execution of an image formation output by the image processing apparatus based on priority execution settings indicating execution order of process execution information set in advance and the process execution information, the image processing apparatus including an image forming device configured to executes the image formation output.

9 Claims, 9 Drawing Sheets

| USER NAME | CARD ID | PASSWORD |
|---|---|---|
| tanaka | vds56w- | **************** |
| nishida | 5bla32* | **************** |
| yamada | *g6hdlf | **************** |
| mori | s3e3Gk2 | **************** |
| saitoh | we6K3r1 | **************** |
| yamashita | S36bjyt | **************** |
| ... | ... | ... |

FIG. 7

URL : http://xxx:8080:index.html

USER NAME [ ]    PASSWORD [ ]

CARD ID [ ]

PRIORITY EXECUTION SETTING

JOB REGISTRATION ORDER ☐    DATA SIZE ORDER ☐

ALPHABETICAL ORDER ☐    JOB NAME ☐

CREATION DATE ORDER ☐    NO SETTING ☐

| USER NAME | PRIORITY EXECUTION SETTING | |
|---|---|---|
| tanaka | JOB REGISTRATION ORDER | |
| nishida | ALPHABETICAL ORDER | |
| yamada | familylog.jdf | |
| mori | CREATION DATE ORDER | |
| saitoh | DATA SIZE ORDER | |
| yamashita | NULL | |
| ... | ... | |

| JOB NAME | CREATION USER NAME | JOB CREATION DATE AND TIME | DATA SIZE | JOB REGISTRATION DATE AND TIME |
|---|---|---|---|---|
| bluetrain.jdf | nishida | 2018/03/ XX10:xx | | 2018/04/XX 00:xx |
| kaigilog.jdf | tanaka | 2017/12/ vv20:07 | | 2018/03/vv 02:07 |
| kanicoro.jdf | saitoh | 2018/02/ gg19:10 | | 2018/03/gg 10:10 |
| familylog.jdf | yamada | 2018/01/04 13:ww | | 2018/02/03 13:ww |
| applemon.jdf | nishida | 2017/11/ss 12:10 | | 2017/11/ss 12:20 |
| ebichill.jdf | saiotoh | 2018/03/03 14:yy | | 2018/03/05 14:yy |
| kaigilog.jdf | tanaka | 2017/12/vv 20:07 | | 2018/02/ff 12:07 |
| ... | ... | ... | | ... |

INFORMATION PROCESSING SYSTEM AND APPARATUS

CROSS-REFERENCE TO RELATED APPLICATION

This patent application is based on and claims priority pursuant to 35 U.S.C. § 119(a) to Japanese Patent Application No. 2018-065116, filed on Mar. 29, 2018, in the Japan Patent Office, the entire disclosure of which is hereby incorporated by reference herein.

BACKGROUND

Technical Field

The present disclosure relates to an information processing system and apparatus.

Background Art

In recent years, computerization of information has been promoted, and image processing apparatuses such as printers and facsimiles used for outputting digitized information and scanners used for digitizing documents are becoming indispensable. Such an image processing apparatus is configured as a multifunction peripheral (MFP) capable of functioning as a printer, a facsimile, a scanner, a copier, etc., by providing an imaging function, an image forming function, a communication function, and the like.

In an information processing system including the image processing apparatus, a print job can be stored in advance in the server and printed at a time suitable for the user, called a "pull print function".

SUMMARY

Embodiments of the present disclosure describe an improved information processing system and apparatus. The information processing system includes the information processing apparatus and an image processing apparatus connected to the information processing apparatus through a network. The information processing apparatus authenticates a user based on a card identifier (ID) acquired through the network, and controls execution of an image formation output by the image processing apparatus based on priority execution settings indicating execution order of process execution information set in advance and the process execution information, the image processing apparatus including an image forming device configured to executes the image formation output.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Embodiments of the present disclosure are described hereinafter with reference to the drawings. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

In the present embodiment, an information processing system 1 including an image processing apparatus such as an MFP that executes scan, print, mail delivery, or a printer, and computer resources provided by cloud computing is described.

Figure 1:
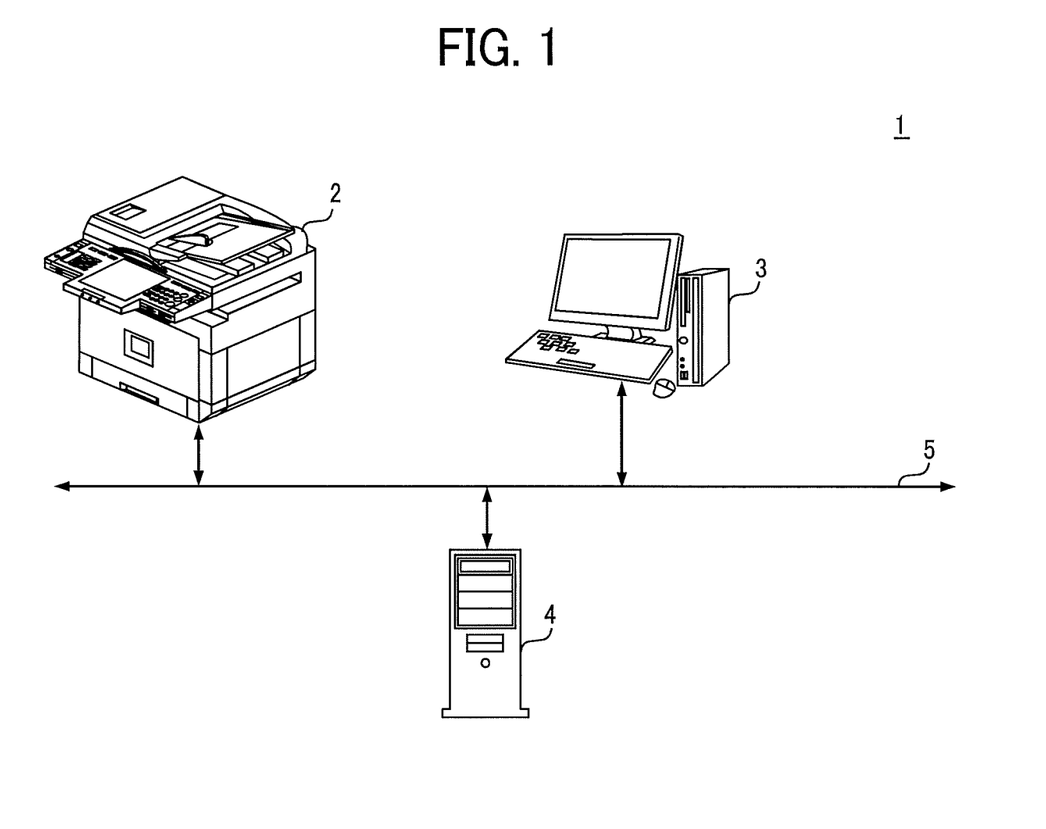
FIG. 1 is a diagram illustrating a configuration of an information processing system according to embodiments of the present disclosure.

FIG. 1 is a diagram illustrating a configuration of the information processing system 1 according to the present embodiment. As illustrated in FIG. 1, the information processing system 1 is configured by connecting an image processing apparatus 2, a server 4, and a PC 3 through a network 5. Note that the image processing apparatus 2 may be configured to include more than the number of image processing apparatuses 2 illustrated in FIG. 1.

The image processing apparatus 2 is an MFP that can be used as a printer, a facsimile, a scanner, or a copier by providing an imaging function, an image forming function, a communication function, and the like.

The image processing apparatus 2 also has a function as a color printer or a monochrome printer that generates cyan, magenta, yellow, and black (CMYK) or monochrome drawing data based on image data and executes image formation output based on the generated drawing data.

Furthermore, the image processing apparatus 2 is equipped with software for generating document data based on an image read by the scanner. The image processing apparatus 2 exchanges data with another image processing apparatus 2, server 4 and PC 3 through the network 5.

The server 4 functions as an authentication device that executes authentication based on authentication information that identifies the user, such as a card ID, a user name, and a password acquired by the image processing apparatus 2 through the card information reading device 109. In addition, the server 4 stores priority execution settings referred to when executing the print job stored in the server 4 for each authenticated user. The priority execution settings is described in detail below.

In the present embodiment, the card ID is information that is obtained by decoding information stored in a storage medium such as an integrated circuit (IC) card or the like assigned to a user, or a coded figure such as Quick Response (QR) code (registered trademark).

The PC 3 is used by the user of the information processing system 1 to store the authentication information of the user of the information processing system 1 and process execution information such as a print job executed in the image processing apparatus 2 in the server 4.

Figure 2:
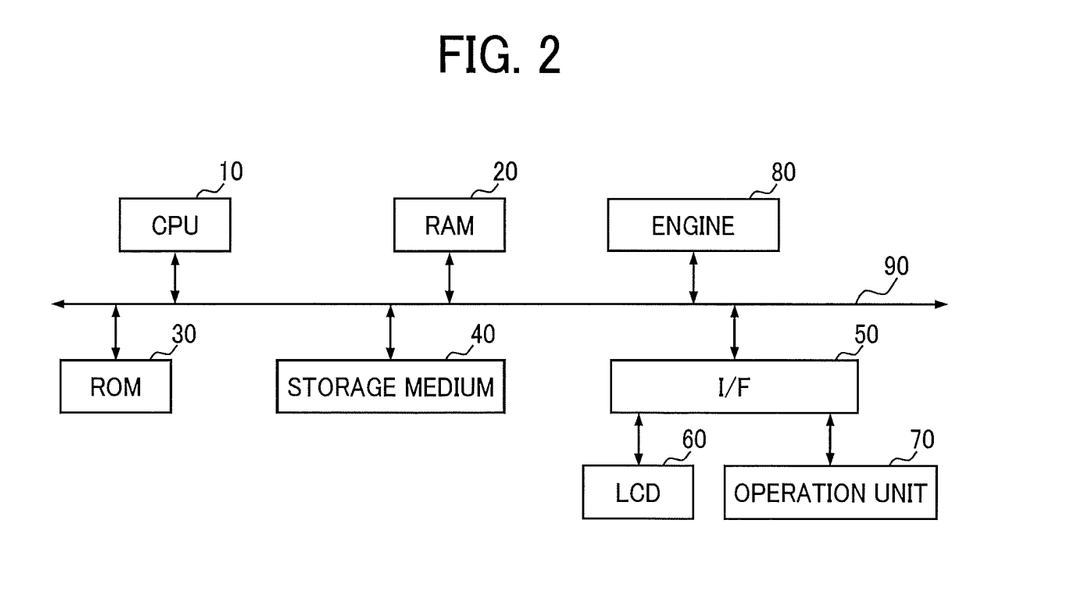
FIG. 2 is a block diagram illustrating a hardware configuration of an information processing apparatus according to embodiments of the present disclosure.

Hereinafter, a hardware configuration of the information processing apparatus such as the image processing apparatus 2 according to the present embodiment is described with reference to FIG. 2. FIG. 2 is a block diagram illustrating the hardware configuration of the image processing apparatus 2 according to the present embodiment. In the information processing system 1 according to the present embodiment, when a job stored in the server 4 is executed, a job desired by the user can be preferentially executed.

The image processing apparatus 2 according to the present embodiment has a configuration similar to that of an information processing apparatus such as a general-purpose PC, a server 4, hardware for implementing the PC 3, and the like. That is, the image processing apparatus 2 according to the present embodiment includes a central processing unit (CPU) 10, a random access memory (RAM) 20, a read only memory (ROM) 30, a storage medium 40 such as a hard disk drive (HDD), and an interface (I/F) 50 connected through a bus 90.

In addition to the above configuration, the image processing apparatus 2 includes an engine 80 for implementing a scanner, a printer, and the like, and a display unit such as a liquid crystal display (LCD) 60 and an operation unit 70 including a keyboard connected through the I/F 50.

The CPU 10 is a processor which controls an entire operation of the image processing apparatus 2. The RAM 20 is a volatile storage medium capable of high-speed reading and writing of data and is used as a work area when the CPU 10 processes data. The ROM 30 is a read-only non-volatile storage medium that stores programs such as firmware.

The storage medium 40 is a nonvolatile storage medium capable of reading and writing data such as an HDD, and stores an operating system (OS), various control programs, application program (hereinafter referred to as application), and the like. The I/F 50 connects and controls the bus 90, various kinds of hardware components such as the LCD 60 and the operation unit 70, the network 5, and the like.

The LCD 60 is a user interface for allowing the user to confirm a state of the image processing apparatus 2 received through the I/F 50. The operation unit 70 includes the keyboard and the like and is a user interface for the user to input data to the image processing apparatus 2. Note that the LCD 60 and the operation unit 70 may be configured as a touch panel using a resistive film method, a surface acoustic wave method, a capacitance method, or the like as a principle of operation theory.

Figure 3:
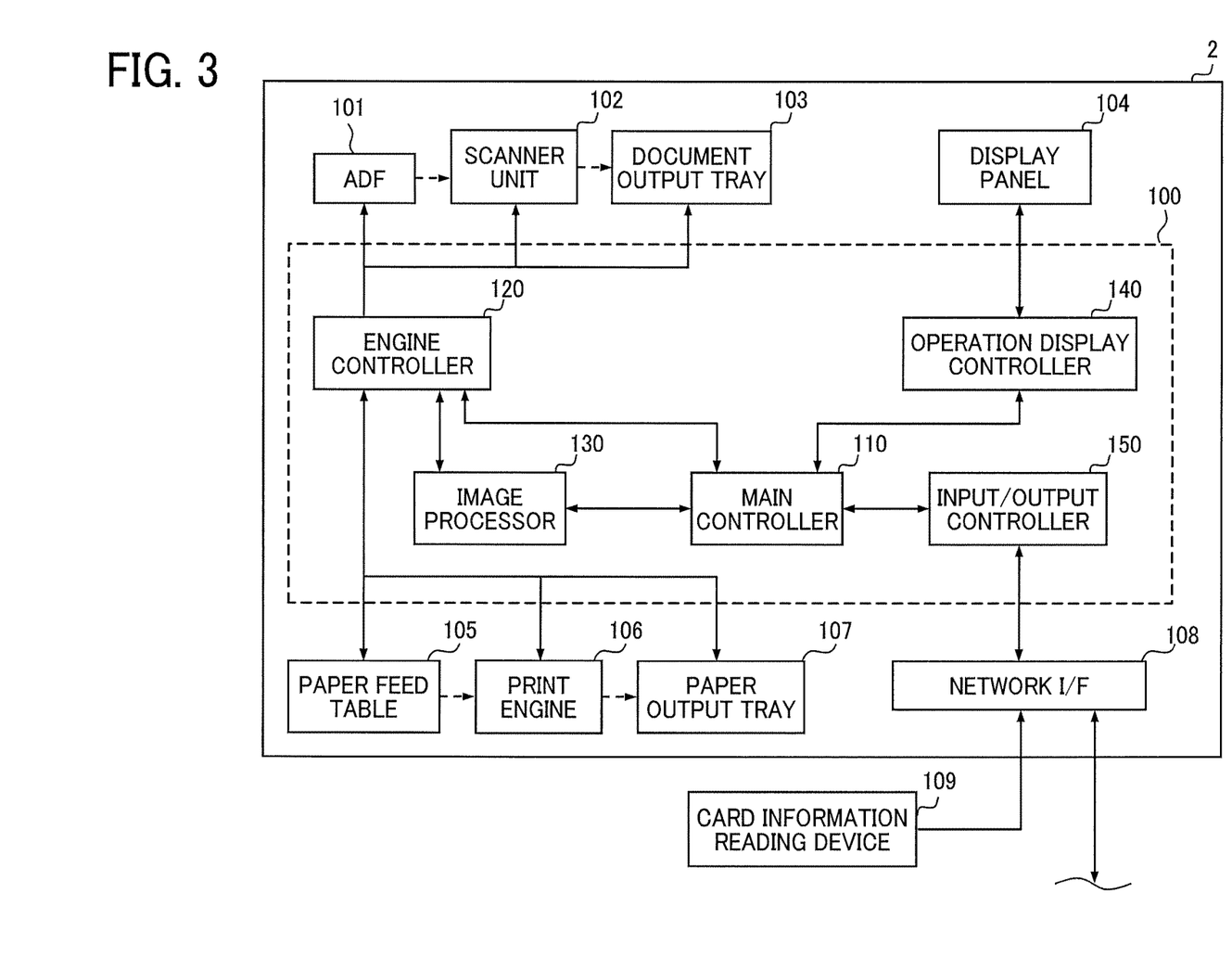
FIG. 3 is a block diagram illustrating a functional configuration of the image processing apparatus according to embodiments of the present disclosure.

With this hardware configuration, the functions of a controller 100 described in FIG. 3 are implemented by the CPU 10 executing processing according to the programs stored in the ROM 30 or read from the storage medium 40 to the RAM 20. A function block for implementing the functions of the image processing apparatus 2 is configured by the combination of the internal functions of the controller 100 and the hardware components configured in this way.

Figure 4:
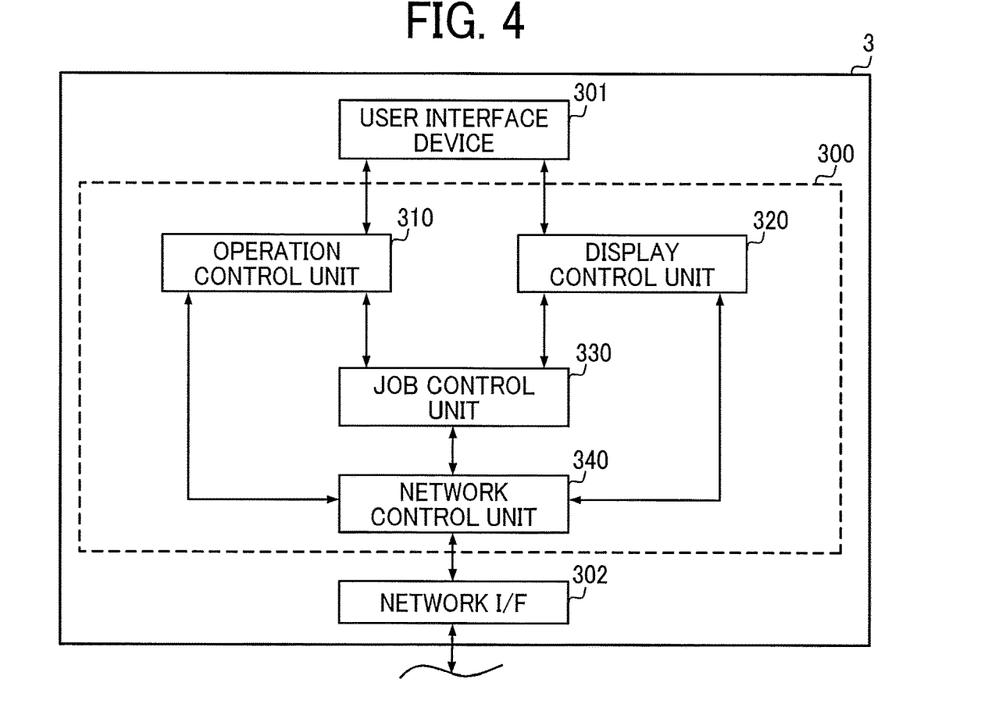
FIG. 4 is a block diagram illustrating a functional configuration of a personal computer (PC) according to embodiments of the present disclosure.

With this hardware configuration, functions of a software controller in the PC 3 are implemented by the CPU 10 executing processing according to the programs stored in a storage medium such as the ROM 30, the storage medium 40, or an optical disk read into the RAM 20. A functional block for implementing a function of the PC 3 described in FIG. 4 is constituted by a combination of the software controller configured in this way and the hardware components.

Figure 5:
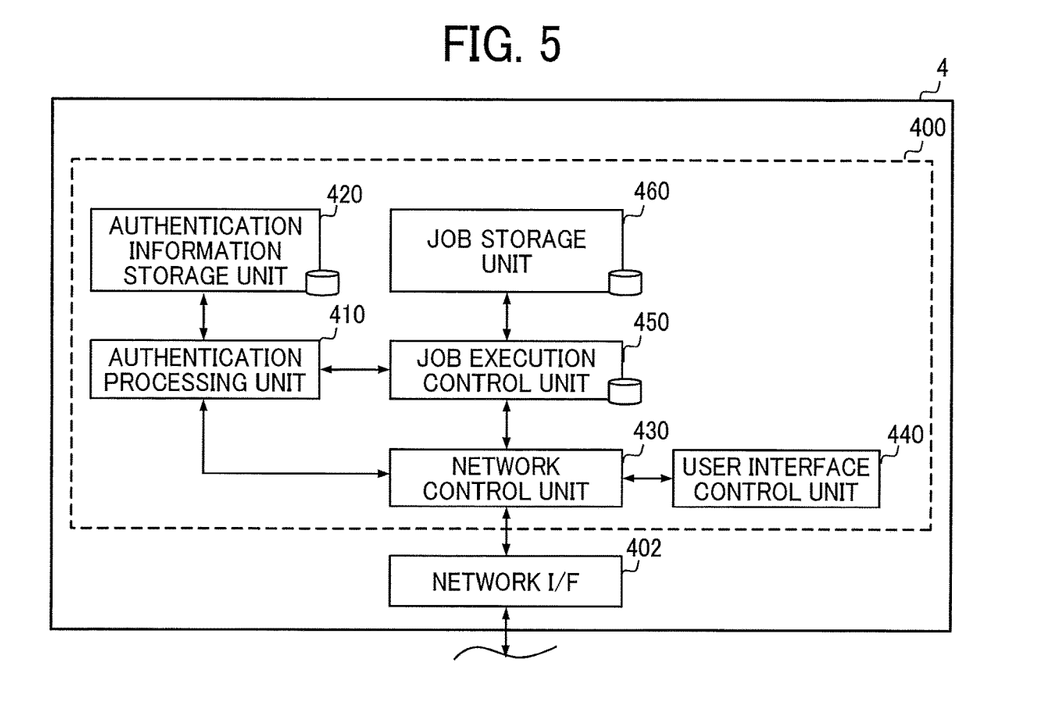
FIG. 5 is a block diagram illustrating a functional configuration of a server according to embodiments of the present disclosure.

With this hardware configuration, functions of a controller 300 in the server 4 are implemented by the CPU 10 executing processing according to the programs stored in a storage medium such as the ROM 30, the storage medium 40, or an optical disk read into the RAM 20. A functional block for implementing the function of the server 4 described in FIG. 5 is constituted by the combination of the function inside the controller 300 thus configured and the hardware components.

Hereinafter, a functional configuration of the image processing apparatus 2 according to the present embodiment is described with reference to FIG. 3. FIG. 3 is a block diagram illustrating the functional configuration of the image processing apparatus 2 according to the present embodiment. As illustrated in FIG. 3, the image processing apparatus 2 includes the controller 100, an automatic document feeder (ADF) 101, a scanner unit 102, a document output tray 103, a paper feed table 105, a print engine 106, a paper output tray 107, and a network I/F 108. In addition to the above configuration, the image processing apparatus 2 is connected to a card information reading device 109 that reads information stored in a storage medium such as the IC card through the network I/F 108.

Further, the controller 100 includes a main controller 110, an engine controller 120, an image processor 130, an operation display controller 140, and an input/output controller 150. In FIG. 3, electrical connection is indicated by a solid arrow and a flow of document or document bundle is indicated by a broken line arrow.

The network I/F 108 is an interface for the image processing apparatus 2 to communicate with another apparatus through a network, and Ethernet (registered trademark) or universal serial bus (USB) interface is used. The network I/F 108 can communicate using the transmission control protocol/internet protocol (TCP/IP), and is implemented by the I/F 50 illustrated in FIG. 2. Further, the image processing apparatus 2 acquires the card ID read by the card information reading device 109 through the network I/F 108.

The controller 100 is implemented by a combination of software and hardware. Specifically, a program that is stored in a nonvolatile memory such as the ROM 30 or a nonvolatile storage medium such as the storage medium 40 or an optical disc is loaded to a volatile memory such as the RAM 20. The CPU 10 executes processing according to the program loaded to the RAM 20 to implement the software controller. The controller 100 is implemented by a combination of the software controller and hardware component such as an IC. The controller 100 controls entire operation of the image processing apparatus 2.

The main controller 110 controls each unit included in the controller 100 and gives an instruction to each unit of the controller 100. That is, the main controller 110 controls each unit included in the controller 100 in order to execute control for executing functions such as copy, print, scan, facsimile, etc. mounted on the image processing apparatus 2.

The engine controller 120 functions as a driver that controls or drives the print engine 106 or the scanner unit 102. The image processor 130 generates drawing data based on image data to be output for printing under control of the main controller 110. This drawing data is information used by the print engine 106 which functions as an image forming unit to form an image on a recording sheet.

Further, the image processor 130 also processes captured data that is input from the scanner unit 102 to generate image data. The image data is information stored in the storage area of the image processing apparatus 2 as a result of a scanner operation and transmitted to another information processing terminal or storage device through the network I/F 108.

The operation display controller 140 displays information on a display panel 104 or notifies the main controller 110 of information input through the display panel 104. The input/output controller 150 inputs data input through the network I/F 108 to the main controller 110. Further, the main controller 110 controls the input/output controller 150 and accesses other devices connected to the network through the network I/F 108 and the network.

When the image processing apparatus 2 operates as a printer, first, the input/output controller 150 receives a print job through the network I/F 108, which means that the input/output controller 150 functions as a print data acquisition unit. The input/output controller 150 transfers the received print job to the main controller 110. Upon receiving the print job, the main controller 110 controls the image processor 130 to generate drawing data based on document data or image data included in the print job.

When the drawing data is generated by the image processor 130, the engine controller 120 controls the print engine 106 to form an image on the paper conveyed from the paper feed table 105 based on the generated drawing data. In other words, the image processor 130, the engine controller 120, and the print engine 106 function as a print output unit.

As a specific form of the print engine 106, it is possible to use an image forming mechanism employing an inkjet method, an electrophotographic method, or the like. A document on which image has been formed by the print engine 106 is discharged to the paper output tray 107.

When the image processing apparatus 2 operates as a scanner, in response to input to the display panel 104 or a scan execution instruction input from an external apparatus through the network I/F 108, the operation display controller 140 or the input/output controller 150 transfers the scan execution instruction to the main controller 110. The main controller 110 controls the engine controller 120 based on the received scan execution instruction.

The engine controller 120 drives the ADF 101 to convey a document S of an imaging target set in the ADF 101 to the scanner unit 102 as described above. Further, the engine controller 120 drives the scanner unit 102 to scan the document conveyed from the ADF 101.

When a document is not set on the ADF 101 and the document is directly set on the scanner unit 102, the scanner unit 102 captures an image of the set document under the control of the engine controller 120. In other words, the scanner 102 operates as an image capturing unit, and the engine controller 120 functions as a reading control unit.

In the imaging operation, an imaging element such as a charge coupled device (CCD) included in the scanner unit 102 optically scans the document, and captured data is generated based on the optical data. The engine controller 120 transfers the data captured by the scanner unit 102 to the image processor 130. Under the control of the main controller 110, the image processor 130 generates image data based on the captured data received from the engine controller 120.

The image data generated by the image processor 130 is acquired by the main controller 110, and the main controller 110 stores the image data in a storage medium attached to the image processing apparatus 2 such as the storage medium 40. In other words, the scanner 102, the engine controller 120, and the image processor 130 cooperate to function as an image input unit. The image data generated by the image processor 130 is directly stored in the storage medium 40 or the like in response to an instruction from the user or is transmitted to an external device through the input/output controller 150 and the network I/F 108.

When the image processing apparatus 2 operates as a copier, the image processor 130 generates drawing data based on the captured data received from the scanner unit 102 by the engine controller 120 or the image data generated by the image processor 130. The engine controller 120 drives the print engine 106 based on the drawing data generated by the image processor 130 in substantially the same manner as described above in connection with the printing operation. When the data formats of the drawing data and the captured data are the same, the captured data can be used as the drawing data.

The image processing apparatus 2 according to the present embodiment executes a print job received from the server 4 and outputs printed matter. In the present embodiment, the server 4 stores the print job received from the PC 3 operated by the user. Hereinafter, a functional configuration of the PC 3 according to the present embodiment is described with reference to FIG. 4.

As illustrated in FIG. 4, the PC 3 has a controller 300, a user interface device 301, and a network I/F 302. Further, the controller 300 includes an operation control unit 310, a display control unit 320, a job control unit 330, and a network control unit 340.

The controller 300 is implemented by a combination of software and hardware. Specifically, a program that is stored in a nonvolatile memory such as the ROM 30 or a nonvolatile storage medium such as the storage medium 40 or an optical disc is loaded to a volatile memory such as the RAM 20. The CPU 10 performs processing according to the program loaded to the RAM 20 to implement a software controller. The controller 300 is implemented by a combination of the software controller and hardware such as an integrated circuit. The controller 300 is a control unit that controls the entire PC 3 and implements a gist function.

The user interface device 301 is an interface through which the user operates the PC 3 such as the LCD 60 and the operation unit 70 illustrated in FIG. 2. In the user interface device 301, the LCD 60 and the operation unit 70 may be configured as an integrated tablet terminal or may be configured as a desktop terminal provided with the LCD 60 and the operation unit 70.

The network I/F 302 is an interface for the PC 3 to communicate with another apparatus through a network, and Ethernet (registered trademark) or a universal serial bus (USB) interface is used. The network I/F 302 is implemented by the I/F 50 illustrated in FIG. 2.

The operation control unit 310 acquires information input by a user operation on the user interface device 301. The display control unit 320 displays information on the user interface device 301. A print job is generated by the user operation on the user interface device 301.

The user selects image information to be printed by operating the user interface device 301, and as conditions for outputting the image, for example, monochrome or color, number of prints, necessity of combined printing, necessity of duplex printing, output destination, image quality, or the like are set.

The job control unit 330 generates a print job for outputting the image information to be printed stored in the PC 3 based on the conditions for outputting the image specified by the user. In the present embodiment, the print job is process execution information in which a condition for outputting image information is set, together with an output instruction of image information to be printed.

The network control unit 340 acquires information input through the network I/F 302 and transmits information to other devices through the network I/F 302. Note that the PC 3 may be configured to generate a print job based on information received from a terminal connected through the network I/F 302. With such a configuration, the PC 3 transmits the print job to the server 4.

Hereinafter, a functional configuration of the server 4 according to the present embodiment is described with reference to FIG. 5. FIG. 5 is a block diagram illustrating the functional configuration of the server 4 according to the present embodiment. As illustrated in FIG. 5, the server 4 according to the present embodiment has a controller 400 and a network I/F 402. Further, the controller 400 includes an authentication processing unit 410, an authentication information storage unit 420, a network control unit 430, a user interface control unit 440, a job execution control unit 450, and a job storage unit 460.

The network I/F 402 is an interface for the server 4 to communicate with another apparatus through a network, and Ethernet (registered trademark) or USB interface is used. The network I/F 402 is implemented by the I/F 50 illustrated in FIG. 2.

The controller 400 is implemented by a combination of software and hardware. Specifically, a program that is stored in a nonvolatile memory such as the ROM 30 or a nonvolatile storage medium such as the storage medium 40 or an optical disc is loaded to a volatile memory such as the RAM 20. The CPU 10 performs processing according to the program loaded to the RAM 20 to implement a software controller. The controller 400 is a control unit that controls the entire server 4 and implements a gist function.

The authentication processing unit 410 stores authentication information such as a card ID, a user name, and a password received from the PC 3 in the authentication information storage unit 420. Further, the card ID read by the card information reading device 109 is acquired from the image processing apparatus 2, and authentication is performed based on the card ID.

Figure 6:
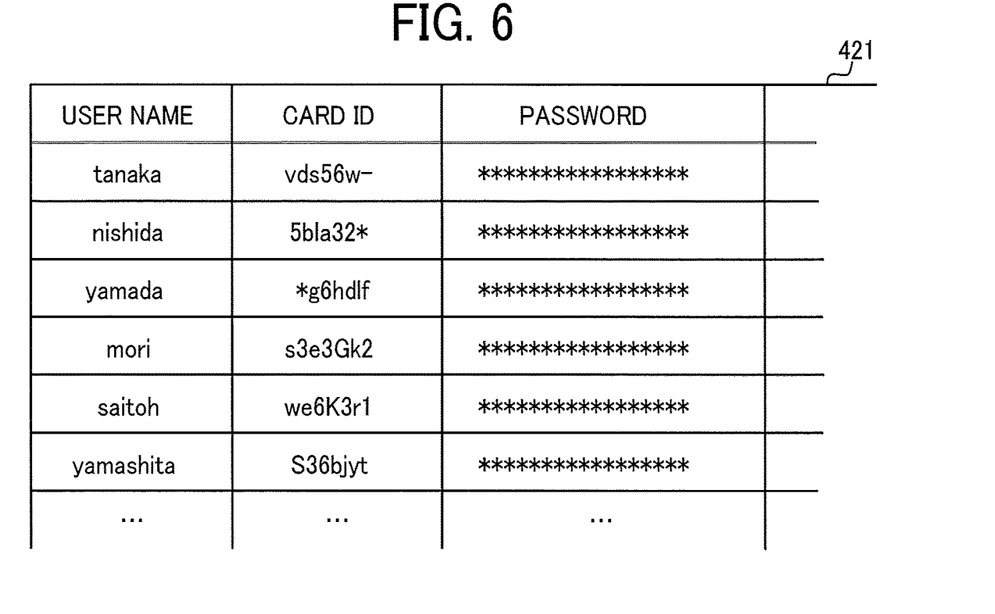
FIG. 6 is a diagram illustrating a configuration of authentication information according to embodiments of the present disclosure.

The authentication information storage unit 420 is a storage unit that stores information such as the card ID, the user name, and the password received from the authentication processing unit 410. As illustrated in FIG. 6, the authentication information storage unit 420 stores the card ID, the user name, and the password in association with each other in an authentication information data table 421. In the present embodiment, it is assumed that authentication information of users with user names "tanaka", "nishida", "yamada", "mori", "saitoh", and "yamashita" are stored.

Figure 7:
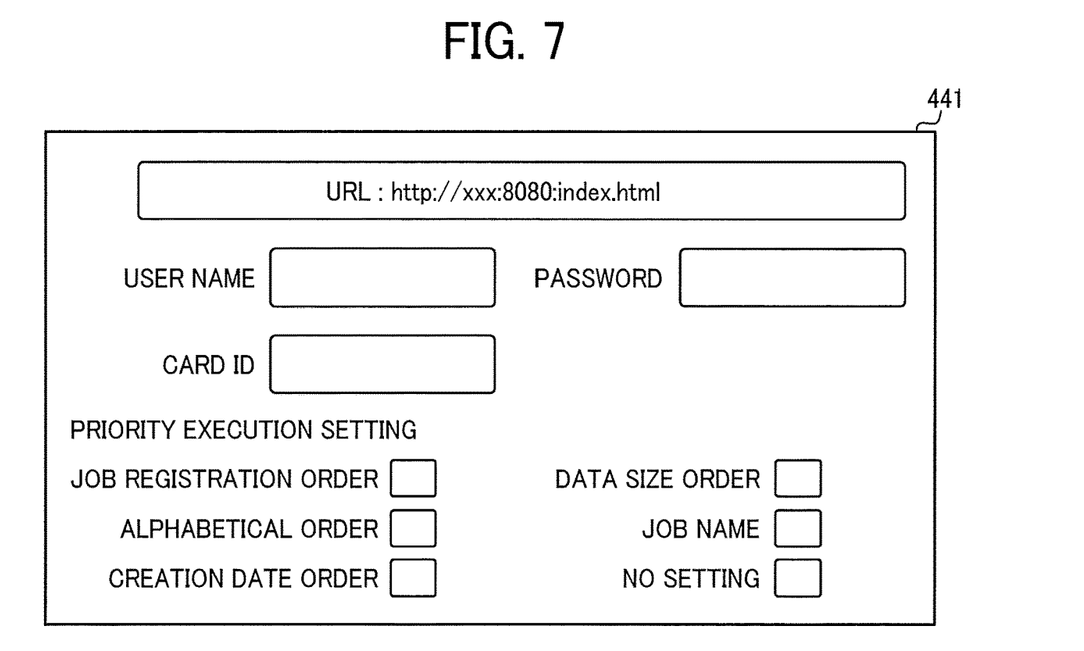
FIG. 7 is a diagram illustrating a screen displayed on the PC according to embodiments of the present disclosure.

The network control unit 430 acquires information input through the network I/F 402 and transmits information to other devices through the network IN 402. The user interface control unit 440 provides an interface displayed on the PC 3 in order to store the authentication information and the print job in the server 4. The user interface control unit 440 may be configured as software executed by the PC 3 in order to store the authentication information and the print job in the server 4 or as a screen display control unit for displaying the screen 441 as illustrated in FIG. 7 on the PC 3.

The user executes an operation based on the screen 441 displayed on the PC 3. For example, a setting value is entered for the items of "user name", "card ID", and "password" on the screen 441. The setting values entered in the respective items based on the operation of the user, which are, "user name", "card ID", and "password" are stored in the authentication information storage unit 420 as authentication information.

On the screen 441, "priority execution setting" which is the priority execution settings set by the user in order to define the order of execution of the print job stored in the server 4 for each user is displayed. The "priority execution setting" may be set when the authentication information is stored in the server 4 or may be set when the print job is transmitted. The setting value of the execution order set in the item of "priority execution setting" is associated with the user name as priority execution settings and is transmitted to the job execution control unit 450 as the priority execution settings.

Figure 8:
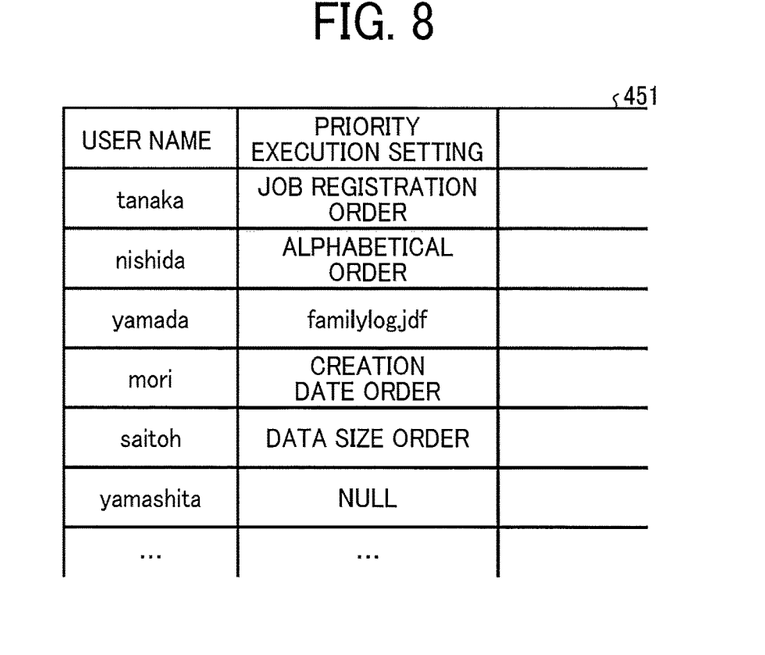
FIG. 8 is a diagram illustrating a configuration of priority execution settings according to embodiments of the present disclosure.

The job execution control unit 450 stores the priority execution settings having a data structure as illustrated in FIG. 8. In addition, the job execution control unit 450 controls which print job to execute based on the priority execution settings for each authenticated user. Therefore, the job execution control unit 450 functions as a process execution control unit and a priority execution settings storage unit.

FIG. 8 is a diagram illustrating a configuration of the priority execution settings according to the present embodiment. As illustrated in FIG. 8, the job execution control unit 450 associates and stores the setting value of the execution order defining the execution order of the print job with the user name in the data table 451. The priority execution settings is the set value of the execution order selected by the user in the item of "priority execution setting" on the screen 441 associated with the user name and transmitted from the PC 3 to the server 4.

Figure 9:
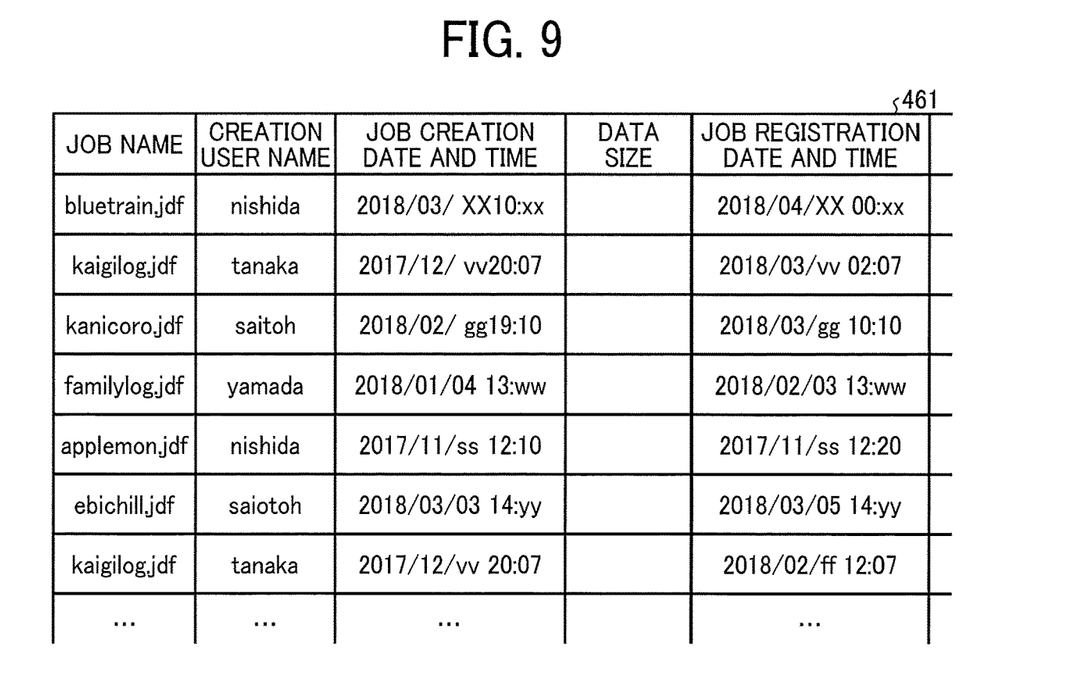
FIG. 9 is a diagram illustrating a configuration of a job storage unit according to embodiments of the present disclosure.

The job storage unit 460 is a process execution information storage unit that stores the print job received from the PC 3. As illustrated in FIG. 9, the job storage unit 460 stores the print job received from the PC 3 and the "job name", "creation user name", "job creation date and time", "data size", "job registration date and time" in association with each other in a job data table 461.

In the information processing system 1 according to the present embodiment, only the authenticated user is allowed to use the functions installed in the image processing apparatus 2 with the configuration described above. In addition, according to the present disclosure the function of the image processing apparatus 2 that can be used by an authenticated user can be changed depending on the user attributes.

Figure 10:
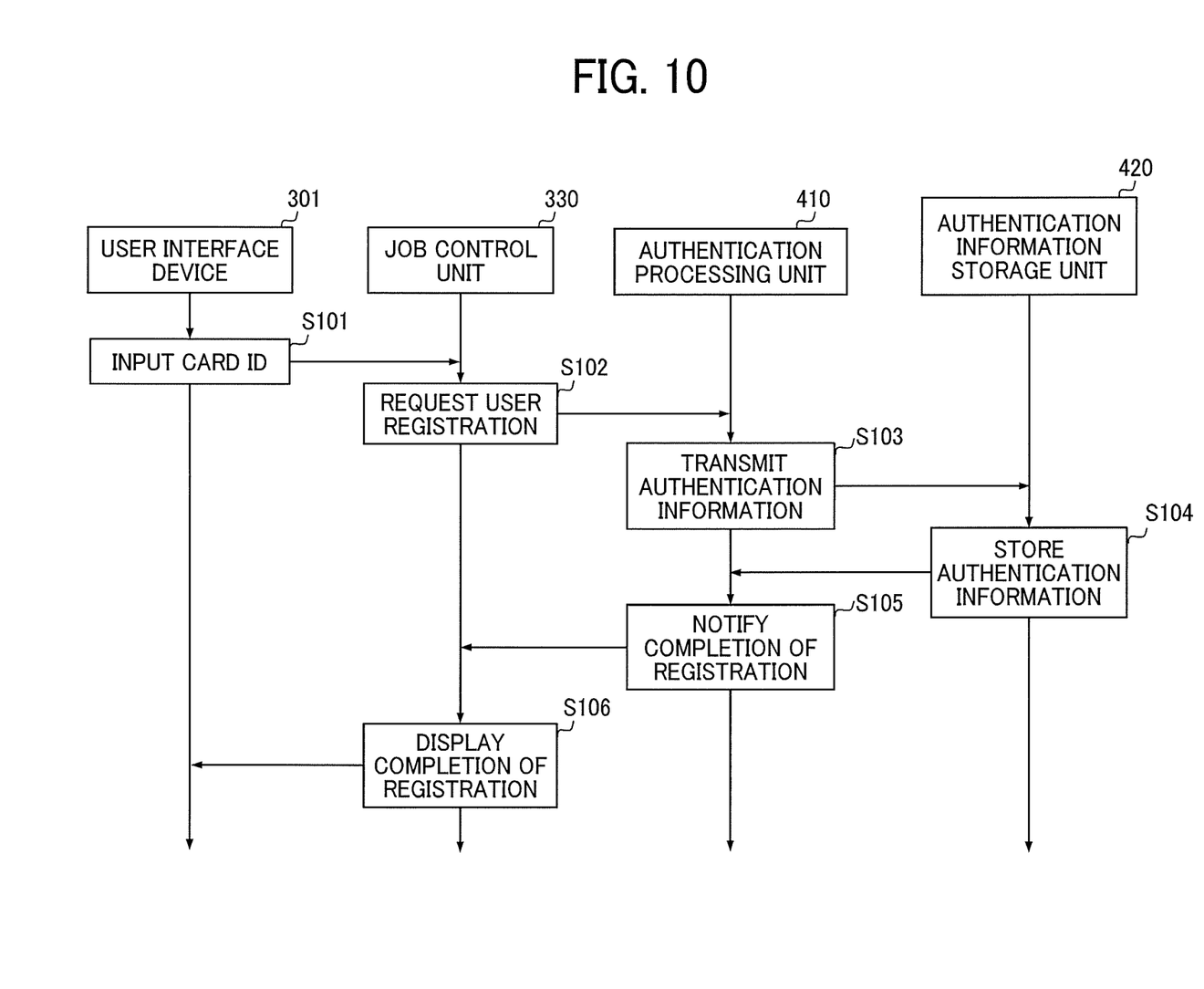
FIG. 10 is a sequence diagram illustrating a user registration process according to embodiments of the present disclosure.

Hereinafter, a process of storing the authentication information in the server 4 according to the present embodiment is described with reference to the sequence diagram of FIG. 10. In step S101, the user operates the screen 441 displayed on the user interface device 301 to input "user name", "card ID", and "password". The "user name", "card ID", and "password" input from the user interface device 301 are transmitted to the job control unit 330 by the operation control unit 310.

Upon receiving the information of "user name", "card ID" and "password", the job control unit 330 transmits the user registration request together with the received information to the authentication processing unit 410 in step S102 Upon receiving the user registration request, the authentication processing unit 410 transmits the information of "user name", "card ID", and "password" to the authentication information storage unit 420 in step S103.

In step S104, the authentication information storage unit 420 stores the received "user name", "card ID", "password" in association with each other. When the authentication information is stored in the authentication information storage unit 420, the authentication processing unit 410 notifies the job control unit 330 that the user registration is completed in step S105.

Upon receiving the notification that the user registration is completed, the job control unit 330 displays on the user interface device 301 a screen for notifying the user that the user registration has been completed through the display control unit 320 in step S106 and terminates the process.

When entering the setting values of "user name", "card ID", and "password" on the screen 441, a card ID read by holding the IC card or the like storing the card ID to the card information reading device 109 may be used.

Based on the authentication information including "user name", "card ID", and "password" stored in the authentication information storage unit 420 as described above, the authentication processing unit 410 executes authentication.

Figure 11:
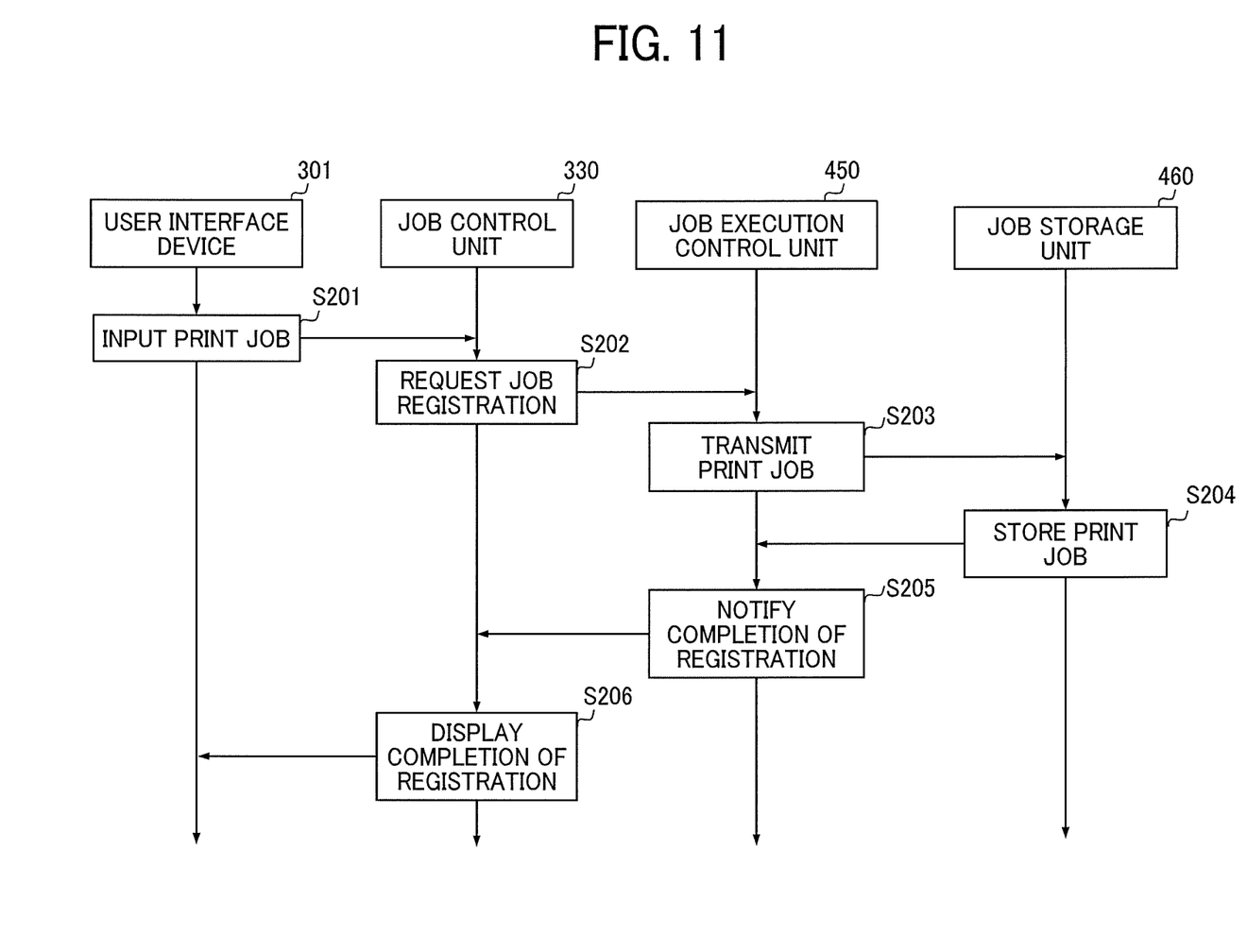
FIG. 11 is a sequence diagram illustrating a job registration process according to embodiments of the present disclosure.

Hereinafter, a process of storing the priority execution settings in the server 4 according to the present embodiment is described with reference to FIG. 11. Note that this process is executed after authentication is completed by a registered user. In step S201, an authenticated user operates the user interface device 301 to input information for generating a print job to be transmitted to the server 4.

The information for generating the print job includes information specifying a document file to be printed, information on conditions for outputting an image specified by the user, and the like. The information for generating the print job input from the user interface device 301 is transmitted to the job control unit 330 by the operation control unit 310.

Upon receiving information specifying the print job, the job control unit 330 generates the print job. In step S202, the job control unit 330 transmits a job registration request to the job execution control unit 450 together with the generated print job and the authenticated user name.

Upon receiving the job registration request, the job execution control unit 450 transmits information of "user name", "job name" which is information on the name of the print job, "job creation date and time" which is information on the date and time when the print job was generated to the job storage unit 460 in step S203.

In addition to the received "user name", "job name", "job creation date and time", the job storage unit 460 stores information on the date and time when "user name", "job name", and "job creation date and time" are received as "registration date and time" and information of data size of the print job as "data size", in association with each other in step S204. When the print job is stored in the job storage unit 460, the job execution control unit 450 notifies the job control unit 330 that the job registration has been completed in step S205.

Upon receiving the notification that the job registration is completed, the job control unit 330 causes the user interface device 301 to display a screen notifying the user that the job registration has been completed through the display control unit 320 in step S206 and terminates the process.

When executing the print job stored in the job storage unit 460 in the present embodiment, the print job is executed according to the priority execution settings set by the user, that is, according to the priority order when executing the print job.

Figure 12:
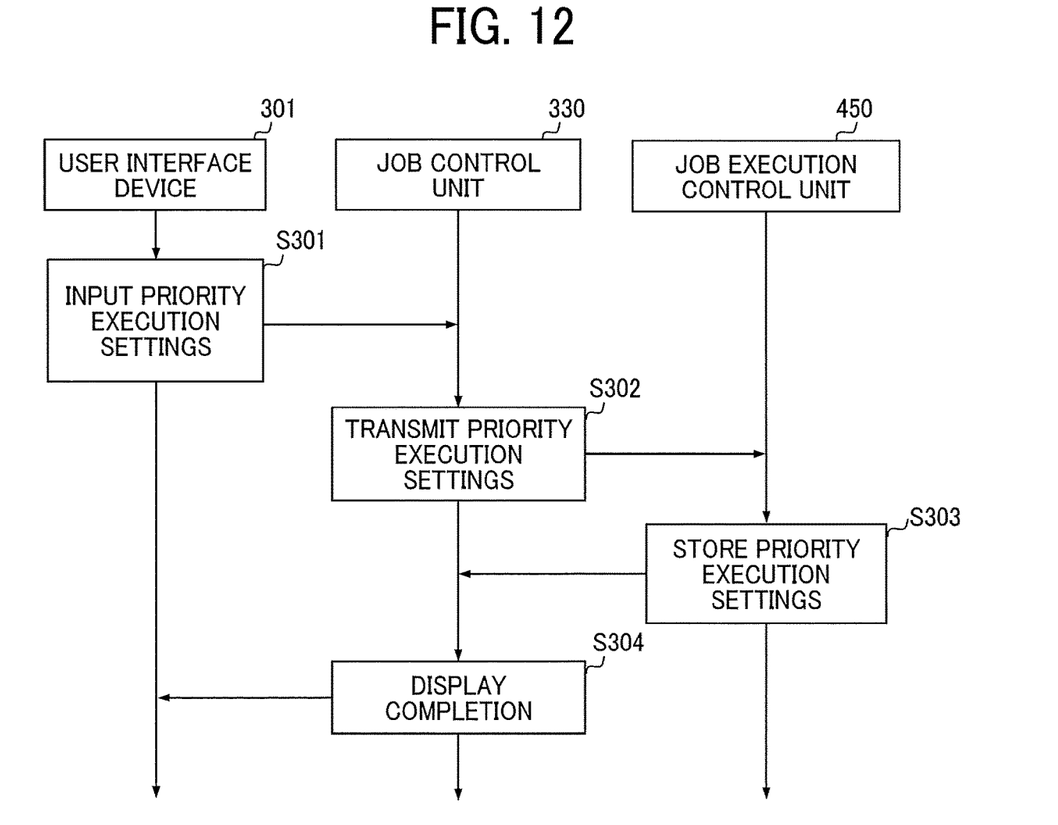
FIG. 12 is a sequence diagram illustrating a registration process of priority execution settings according to embodiments of the present disclosure.

Hereinafter, a process for setting the order of priority when executing the print job according to the present embodiment is described with reference to FIG. 12. This process may be executed in parallel with the user registration based on the setting values entered on the screen 441 when performing the user registration process of FIG. 11, or the authenticated user may operate the screen 441 to execute the process.

In step S301, the user operates the screen 441 displayed on the user interface device 301 to input the setting value for the item of "priority execution setting", that is, the item for setting the priority execution settings.

In the item of "priority execution setting", as illustrated in FIG. 7, options such as "job registration order", "alphabetical order", "creation date order", "data size order", "job name", "no setting" are included.

The "setting value" included in the priority execution settings is the value indicating the execution order at the time of executing the print job, in other words, the information giving the priority of execution for each print job.

Therefore, although the execution order according to the present embodiment corresponds to priority, for example, the order of generation of print jobs, or the order of accumulation, however the present disclosure is not limited to those based on information that can uniquely determine the execution order of print jobs. The execution order (priority) of the print job according to the present embodiment can be flexibly set by the user, based on the element to be prioritized.

The user selects one of the options of "job registration order", "alphabetical order", "job creation date order", "data size order", "job name", "no setting" using the user interface device 301. Information on the selected item of "priority execution setting" input by the user from the user interface device 301 is transmitted to the job control unit 330 by the operation control unit 310.

Here, on the assumption that the item "alphabetical order" is selected by the user whose "user name" is "nishida", the following explanation is made.

In response to receiving "alphabetical order" as the selected item of "priority execution setting", the job control unit 330 transmits the information of the received selection item of "priority execution setting" and the "user name" of the user who selected the "priority execution setting" to the job execution control unit 450 in step S302.

In other words, the job control unit 330 transmits to the job execution control unit 450 that the setting item of "alphabetical order" is selected by the user whose "user name" is "nishida" in step S302.

Upon receiving the information on the selected item of "priority execution setting" and the information on the "user name" of the authenticated user, the job execution control unit 450 stores in the data table 451 the selected item of "priority execution setting" and the selection item of "user name" in association with each other and notifies the job control unit 330 in step S303.

That is, in step S303, the job execution control unit 450 stores that the "priority execution setting" of the user of "user name: nishida" is "alphabetical order" in the data table 451.

Upon receiving the notification that the selected item of "priority execution setting" has been stored, the job control unit 330 displays on the user interface device 301 a screen notifying the user that the job registration has been completed through the display control unit 320 in step S304 and terminates the process.

Upon receiving the execution command of the print job from the authenticated user, the job execution control unit 450 selects which print job to execute in accordance with the priority execution settings. Hereinafter, a process for executing the print job according to the present embodiment is described with reference to FIG. 13.

Figure 13:
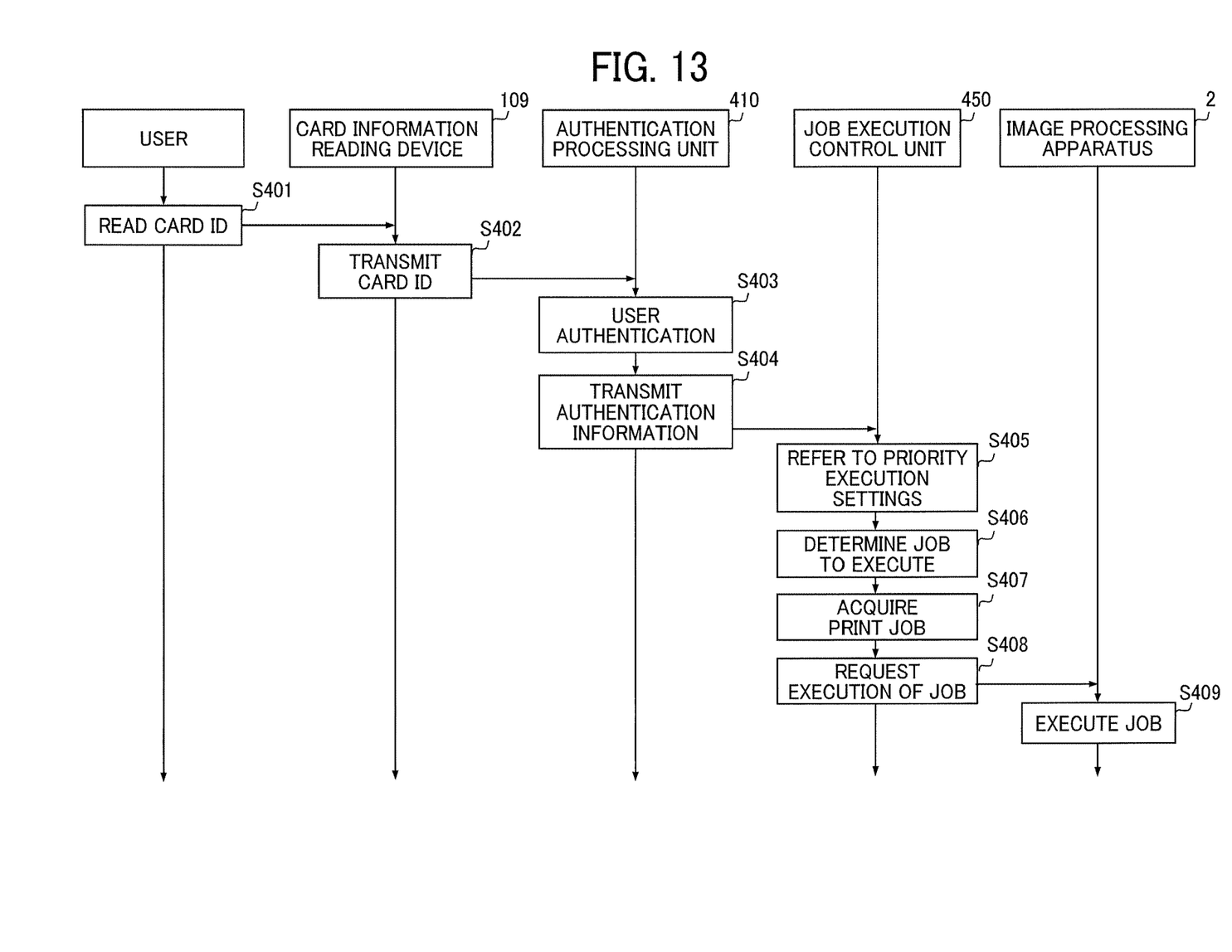
FIG. 13 is a sequence diagram illustrating a process of executing a job according to embodiments of the present disclosure.

In step S401, the user brings an IC card close to the card information reading device 109 and causes the card information reading device 109 to read a card ID stored in the IC card. In step S402, the card information reading device 109 reads the card ID and transmits the read card ID to the authentication processing unit 410.

The following description is made assuming that the user with the user name "nishida" caused the card information reading device 109 to read the IC card with the card ID "5 bla 32 *".

In step S403, the authentication processing unit 410 executes authentication based on whether the received card ID "5 bla 32 *" is stored in the authentication information data table 421. At this time, when the received card ID is stored in the authentication information data table 421, the authentication processing unit 410 determines that the user specified by the card ID is an authenticated user.

As illustrated in FIG. 6, since the card ID "5 bla 32 *" is stored in the authentication information data table 421, the user with the user name "nishida" is authenticated.

When the authentication is completed, the authentication processing unit 410 transmits the authentication information of the user to the job execution control unit 450 in step S404. Here, the authentication processing unit 410 transmits the authentication information including the user name, the card ID, and the password of the user name "nishida" to the job execution control unit 450.

In response to receiving the authentication information, the job execution control unit 450 refers to the data table 451 and acquires the priority execution settings including the same user name as the "user name" of the received authentication information in step S405.

In step S405, the job execution control unit 450 acquires the priority execution settings indicating that the user with the user name "nishida" set the priority order when executing the print job as "alphabetical order".

In step S406, the job execution control unit 450 determines a print job to be executed according to the priority execution settings acquired in step S405. In the priority execution settings of the user name "nishida", the print job is set to be executed in "alphabetical order".

As illustrated in FIG. 9, in the job data table 461, a print job whose file names are "bluetrain.JDF" and "applemon-.JDF" is stored in the job storage unit 460 as a print job of the user name "nishida". In accordance with the setting of the priority execution settings of the user name "nishida", the job execution control unit 450 determines that among these print jobs, the print job with the file name "applemon.JDF" is to be executed.

In step S407, the job execution control unit 450 acquires the print job "applemon.JDF" from the job storage unit 460 and in step S408, an execution request of the print job is transmitted to the image processing apparatus 2 together with the acquired print job "applemon.JDF". In step S409, the image processing apparatus 2 executes the received print job "applemon.JDF" according to the execution request.

As described above, in the information processing system 1 according to the present embodiment, it is possible to store the print job in advance in the server 4 and to execute the print job according to the execution order determined by the authenticated user. Therefore, since it is not necessary for the user to perform complicated operations to select a print job to execute, it is possible to execute the print job with high convenience.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

What is claimed is:

1. An information processing system comprising:
an information processing apparatus; and
an image processing apparatus connected to the information processing apparatus through a network,
the information processing apparatus including a processor configured to:
authenticate a user based on a card identifier acquired through the network; and
control execution of image formation output by the image processing apparatus based on priority execution settings indicating execution order of process execution information set in advance and the process execution information,
the image processing apparatus including an image forming device configured to execute the image formation output.

2. The information processing system of claim 1, wherein the processor of the information processing apparatus is further configured to:
store process execution information;
determine, from the process execution information that is stored, the process execution information to be executed by the image processing apparatus, based on the priority execution settings set in advance; and transmit the determined process execution information and an execution instruction of the process execution information to the image processing apparatus, wherein the image forming device of the image processing apparatus executes the image formation output based on the process execution information received from the information processing apparatus.

3. The information processing system of claim 2, wherein when the priority execution settings set the execution order based on a file name of the process execution information, the processor of the information processing apparatus determines the process execution information to be executed by the image processing apparatus based on the file name of the process execution information.

4. The information processing system of claim 2, wherein when the priority execution settings set the execution order based on a creation date and time of the process execution information, the processor of the information processing apparatus determines the process execution information to be executed by the image processing apparatus based on the creation date and time of the process execution information.

5. The information processing system of claim 2, wherein when the priority execution settings set the execution order based on a date and time when the process execution information is stored, the processor determines the process execution information to be executed by the image processing apparatus based on the date and time at which the process execution information is stored among the stored process execution information.

6. The information processing system of claim 2, wherein when the priority execution settings set the execution order based on data size of the process execution information, the processor determines the process execution information to be executed by the image processing apparatus based on the data size of the process execution information among the stored process execution information.

7. The information processing system of claim 2, wherein when the priority execution settings set a file name of the process execution information, the processor transmits the process execution information corresponding to the file name and the execution instruction of the process execution information to the image processing apparatus.

8. The information processing system of claim 1, wherein the processor is further configured to:

display a screen for setting the priority execution settings; and store the priority execution settings for each user of the system.

9. An information processing apparatus comprising:

a memory that stores a plurality of instructions; and a processor, when executing the plurality of instructions, configured to:

authenticate a user based on a card identifier acquired through a network; and control execution of an image formation output by an image processing apparatus connected through the network, based on priority execution settings indicating execution order of process execution information set in advance and the process execution information.

* * * * *